United States Patent [19]
Scott

[11] Patent Number: 5,660,330
[45] Date of Patent: Aug. 26, 1997

[54] AUTOMATED PESTICIDE APPLICATOR SYSTEM

[76] Inventor: James F. Scott, 5828 W. St. John Ave., Glendale, Ariz. 85308

[21] Appl. No.: 398,505

[22] Filed: Feb. 28, 1995

Related U.S. Application Data

[63] Continuation-in-part of Ser. No. 178,808, Jan. 7, 1994, abandoned.

[51] Int. Cl.[6] .......................... A01M 7/00; A01M 17/00; B05B 7/26
[52] U.S. Cl. .................. 239/70; 239/305; 239/310
[58] Field of Search ..................... 239/10, 70, 145, 239/208, 305, 310, 318; 405/36, 52, 229; 52/168, 169.1; 43/124, 132.1

[56] References Cited

U.S. PATENT DOCUMENTS

| | | | |
|---|---|---|---|
| 2,807,505 | 9/1957 | Weitzel | 239/145 |
| 3,370,571 | 2/1968 | Knapp | 239/310 X |
| 3,570,508 | 3/1971 | Boggs et al. | 239/310 X |
| 3,614,841 | 10/1971 | Query | 43/124 |
| 3,840,182 | 10/1974 | Geffroy | 239/145 |
| 4,534,143 | 8/1985 | Goines et al. | 52/169.1 X |
| 4,742,641 | 5/1988 | Cretti | 43/132.1 |
| 4,883,086 | 11/1989 | Lejnar | 239/318 |
| 4,895,303 | 1/1990 | Freyvogel | 239/310 X |
| 5,007,197 | 4/1991 | Barbett | 43/124 |
| 5,133,498 | 7/1992 | Sealy et al. | 239/310 X |
| 5,184,418 | 2/1993 | Fletscher | 43/124 |
| 5,199,645 | 4/1993 | Anderson et al. | 239/310 |
| 5,203,504 | 4/1993 | Frost et al. | 239/10 |
| 5,347,749 | 9/1994 | Chitwood et al. | 43/124 |
| 5,364,030 | 11/1994 | Murdock et al. | 239/310 |
| 5,366,159 | 11/1994 | Childers | 239/310 |

FOREIGN PATENT DOCUMENTS

| | | | |
|---|---|---|---|
| 2221074 | 11/1974 | France | 43/124 |

*Primary Examiner*—Lesley D. Morris
*Attorney, Agent, or Firm*—Parsons & Goltry; Robert A. Parsons; Michael W. Goltry

[57] ABSTRACT

An automated pesticide applicator system including a pesticide storage receptacle having an aspirator, a conduit having a receiving end constructed to be attached to a water source and having a backflow valve therein to prevent the flow of water from the conduit to the source of water and to allow the flow of water in the opposite direction, a fluid control valve having an inlet end connected to the conduit and an outlet end connected to aspirator, and a soaker tube attached to the aspirator, the soaker tube is generally positioned to surround a structure to be protected and is buried a shallow depth in the ground.

12 Claims, 4 Drawing Sheets

AUTOMATED PESTICIDE APPLICATOR SYSTEM

This is a continuation-in-part of application Ser. No. 08/178,808, filed 7 Jan. 1994, which is now abandoned.

BACKGROUND OF THE INVENTION

1. Field of the Invention

This invention relates to pesticide applicators.

More particularly the present invention relates to automated pesticide applicator systems.

In a further and more specific aspect, the instant invention concerns automated pesticide applicator systems which form a protective barrier around a structure.

2. Prior Art

Many types of pesticide applicator systems to protect a structure from pests are well known. The owners of the structure generally have the choice of hiring a professional bug exterminating company to apply the pesticides or may choose to apply the pesticides themselves. In both cases, most of these systems employ a sprayer to apply a pesticide solution on top of the soil around the foundation of the structure to be protected.

Most professional pesticide applicators use a motorized sprayer system attached to a tank truck filled with the pesticide. These trucks contribute to the increase of traffic on the roads and, when driven, contribute to air pollution. Also, the applicator usually has to drive and operate these systems on local neighborhood streets. If there were to be an accident or a leak causing a pesticide spill, neighborhood families, including children and pets, could be at risk and the environment of the neighborhood could be damaged. Professional pesticide application can be extremely expensive, costing the owner of the structure as much as five hundred dollars a year or more and the owner, also, may have to remember to call the professional monthly to make sure the spraying will be done.

If the owners of the structure cannot afford or do not want to hire a professional to do the pesticide treatment, they may do the application themselves. In these cases, a hand held sprayer with a small attached reservoir is generally used. Though this method is generally less expensive and there is less danger to the neighborhood, the sprayer is usually stored in a shed or garage which could cause these areas to become contaminated with pesticides. Furthermore, there is always a chance of children or pets coming into contact with the contamination or the pesticides and becoming poisoned. Also, the owner must find the time and remember to spray the structure each month, which may be difficult during busy or stressful times.

These sprayers, used by either an amateur or a professional, form a very effective bug barrier if the sprayer is used appropriately. Unfortunately in most cases, because it is time consuming and there is usually so much area to spray, small sections can be missed leaving holes in the pesticide barrier for insects and the like to sneak through. Also, not only do the sprayers deliver the pesticide solution to the ground around the foundation, they also disperse pesticide vapors into the air. These vapors, which can take quite a while to disperse, may cause breathing problems for anyone near by, this includes the person applying the pesticide, and may leave a lingering nasty odor. Therefore, special precautions, including wearing specialized clothing and equipment such as a respirator or a mask and not spraying on windy days, may need to be taken.

Other problems, caused by spraying pesticides, may include, damage caused to the landscape around the structure and harm caused to pets in the area. Because the pesticide must be sprayed directly on the edge of the foundation to be protected, the landscaping around the structure may be damaged by being sprayed directly with the pesticide solution or by being trampled while the person spraying tries to get to the foundation. Pets can wander through the pesticide after it has been sprayed and pick it up on their paws, tracking it into the structure or poisoning themselves by swallowing the pesticide while cleaning off their paws. Also, if a rain shower occurs within 24 hours after the structure is sprayed, the pesticide may be washed away by the rain and then the structure will have to be sprayed again.

It would be highly advantageous, therefore, to remedy the foregoing and other deficiencies inherent in the prior art.

Accordingly, it is an object of the present invention to provide a pesticide applicator system which is fully automated.

Another object of the invention is the provision of a pesticide applicator system which is safer for the environment, children and pets.

And another object of the invention is to provide a pesticide applicator system which uses a lower concentration of pesticides.

Still another object of this invention is the provision of a pesticide applicator system which does not release fumes into the air.

Yet another object of the invention is to provide a pesticide applicator system which provides an even and continuous protection barrier.

Yet still another object of the immediate invention is the provision of a pesticide applicator system which is inexpensive to purchase and use.

And a further object of the invention is to provide a pesticide applicator system which is easy to install.

Still a further object of the invention is to provide a pesticide applicator system which is effective at impeding insects and the like.

And still a further object of the invention is to provide a pesticide applicator system which is simple and takes little or no time to use.

SUMMARY OF THE INVENTION

Briefly, to achieve the desired objects of the invention in accordance with the preferred embodiments thereof, provided is an automated pesticide applicator system having a pesticide storage receptacle with an aspirator, a conduit having a receiving end constructed to be attached to a water source and a backflow valve therein to prevent the flow of water from the conduit to the source of water, a valve having an inlet end connected to the conduit and an outlet end connected to the aspirator, and a soaker tube attached to the aspirator.

More specifically, in a first embodiment of the invention the valve is an electrically operable valve and a timer/controller is coupled to the valve so as to control the operation thereof.

In a further embodiment of the invention, a method of protecting a structure from insects or the like is provided. Where protecting the structure includes providing the automated pesticide applicator system, then installing and burying the soaker tube, of the automated pesticide application system, substantially completely around the structure. Next a pesticide is supplied in the receptacle, the receiving end of the conduit is attached to a water source, and the valve periodically operated to allow water to flow from the conduit, through the aspirator to mix with the pesticide, and to flow into the soaker tube.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which.

DETAILED DESCRIPTION OF THE PREFERRED EMBODIMENT

Figures 1, 2:
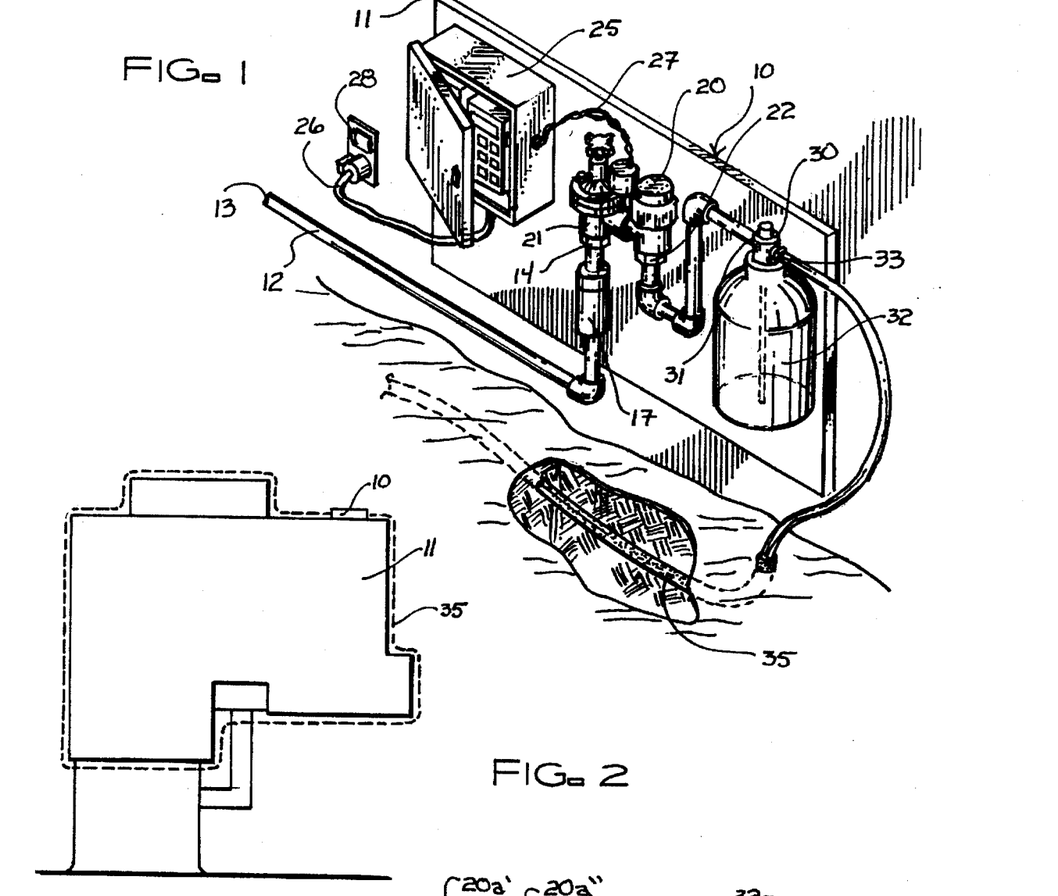
FIG. 1 is a perspective view of an embodiment of a pesticide applicator system incorporating the present invention.
FIG. 2 is a top plan view of a residence having a pesticide applicator system as illustrated in FIG. 1.

Turning now to the drawings, in which like reference characters indicate corresponding elements throughout the several views, attention is first directed to FIG. 1 which illustrates an embodiment of an automated pesticide applicator system 10 affixed to the outside of a structure 11. Automated pesticide applicator system 10 includes a conduit 12 with a receiving end 13, which is constructed to be attached to a water source of structure 11, and a supply end 14. Conduit 12, also, has a backflow valve 17 therein to prevent the flow of water from conduit 12 to the water source while allowing the flow of water in the opposite direction, thereby not allowing automated pesticide applicator system 10 to contaminate the water source. Supply end 14 of conduit 12 is attached to a fluid control valve 20 at an inlet end 21. Also, fluid control valve 20 has an outlet end 22. For purposes of reference, an exemplary valve 17 is the commercially available device known as "Backflow Preventer Model No. 106", manufactured by Aquapure Moisture Master. Similarly, the valve distributed by IPU and designated "Series 600" is typical of control valve 20.

Fluid control valve 20, in this embodiment, is constructed out of polypropylene, but it should be understood that a thermoplastic, brass, copper or the like fluid control valve may be used. Also, an electrically operable solenoid valve has been used in this embodiment, but it should be understood by those skilled in the art that a fluid control valve which is manually or electrically operable may be used. The operation of fluid control valve 20 depends on whether fluid control valve 20 is operated manually or electrically. In this embodiment, the operation of fluid control valve 20 is controlled by a timer/controller 25, where timer/controller 25 is a single station control mechanism, but it should be understood that timer/controller 25 may be a home computer, clock timer or the like. Exemplary is timer/controller model "I-24- single station" supplied by the Bastow Company. Timer/controller 25 is attached to a source of electricity by a cord 26 and attached to fluid control valve 20 by a wire 27. The source of electricity, illustrated in FIG. 1, is a standard electrical outlet 28 of structure 11, but it should be understood that a battery or the like may also be used.

Outlet end 22 of fluid control valve 20 is attached to an inlet 31 of an aspirator 30, such as the model "283" or "284" with "K-184-D" assembly lit distributed by Arizona Industrial Supply, of a pesticide storage receptacle 32. Aspirator 30, in this embodiment is a chemical injector cap attached to the top of pesticide storage receptacle 32, but any aspirator which can deliver or be set to deliver a predetermined pesticide-to-water ratio may be used. In this embodiment a pesticide-to-water ratio of 3 fluid ounces of pesticide to 15 gallons of water is preferred. An outlet 33 of aspirator 30 is attached to a soaker tube 35. Soaker tube 35 is a half inch perforated rubber tubing, commercially available from Aqua Moisture Systems, but it should be understood that any diameter, porous or perforated tubing of rubber, PVC, plastic or the like may be used. Soaker tubing, which is analogous to a sponge through which liquid seeps, is preferable to tubes with holes which can spurt and clog.

Automated pesticide applicator system 10 protects structure 11 from insects or the like, by providing a barrier around structure 11 as illustrated in FIG. 2. This barrier is created by installing soaker tube 35 substantially completely around structure 11 and burying soaker tube 35 a shallow depth underground. After soaker tube 35 has been installed, receiving end 13 of conduit 12 is attached to the water source and water is allowed to flow at an approximate water pressure of 30 psi (the water pressure can be controlled at the water source or by a pressure valve in conduit 12) into conduit 12. Then fluid control valve 20 is periodically operated (approximately twenty minutes once a month), to allow the flow of water from conduit 12 through aspirator 30, to mix with the pesticides stored in storage receptacle 32 attached to aspirator 20, and into soaker tube 35. As the water/pesticide solution flows into soaker tube 35 it is slowly released into the ground at a preferred rate of 4 gallons per minute for a 300 foot length of soaker tube, forming a protective pesticide barrier around structure 11.

Figure 3:
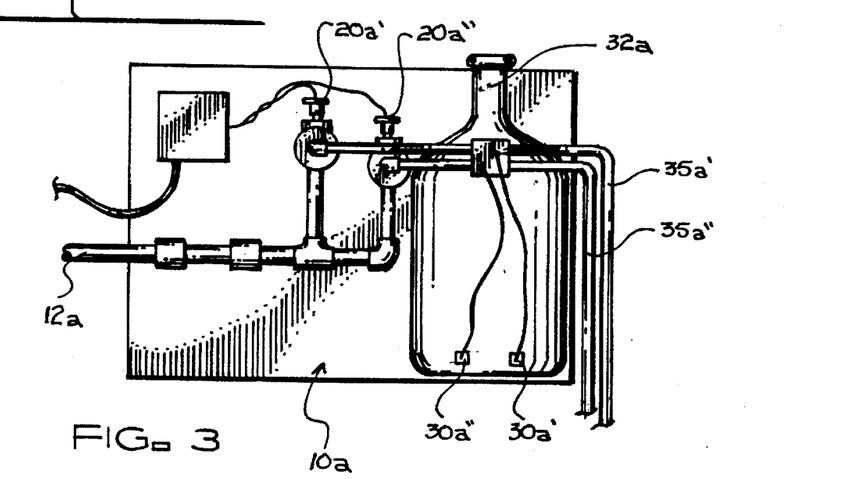
FIG. 3 is a side elevational view of another embodiment of a pesticide applicator system incorporating the present invention.

Another embodiment of an automated pesticide applicator system 10a is illustrated in FIG. 3, wherein the conduit 12a is attached to a pair of fluid control valves 20a' and 20a' Fluid control valve 20a' is then attached to an aspirator 30a' which is attached to a soaker tube 35a' and fluid control valve 20a" is attached to an aspirator 30a" which is attached to a soaker tube 35a". Soaker tubes 35a' and 35a" can then be installed to form a barrier around either one structure, as illustrated in FIG. 2, or a plurality of structures. It should be understood that though a pair of fluid control valves, aspirators and soaker tubes are illustrated in FIG. 3 any number of fluid control valves, aspirators and soaker tubes may be used in one automated pesticide applicator system.

The instant invention is a fully automated pesticide applicator system which provides an even and continuous protection barrier with a lower concentration of pesticides that does not release fumes into the air. Thereby, providing a system which is effective at impeding insects and the like while being safer for the environment, children and pets, inexpensive to purchase, easy to install and simple to use.

Figure 4:
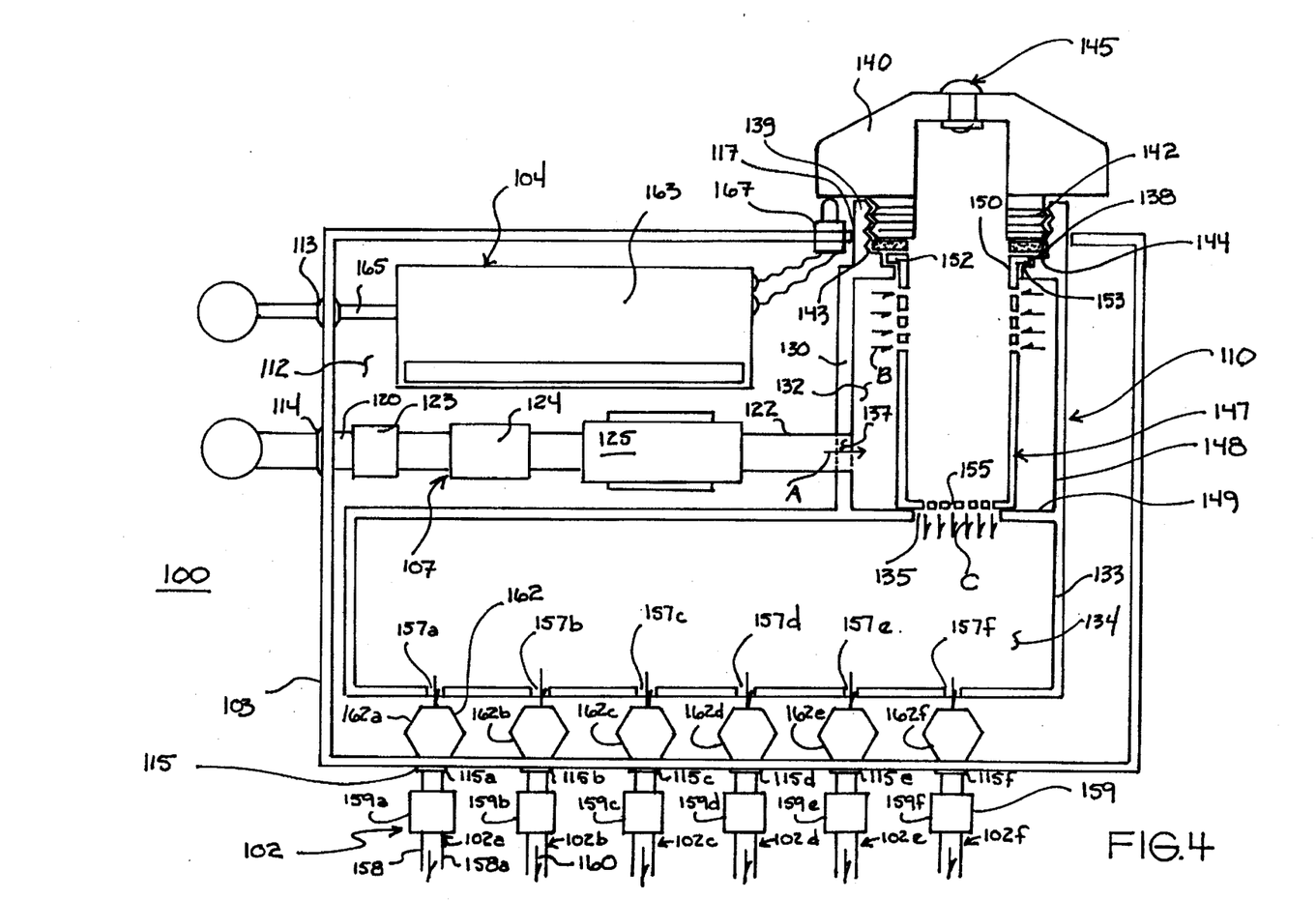
FIG. 4 is a sectional side view of another embodiment of a pesticide applicator system.

A further embodiment of a pesticide applicator system generally designated 100, is illustrated in FIG. 4. Pesticide applicator system 100 includes pesticide distribution devices 102 coupled to a housing 103 containing a control assembly 104, a water supply assembly 107, and a mixing assembly 110. An insecticide solution is supplied from housing 103 to distribution devices 102 in controlled amounts and to locations as desired. Housing 103 is preferably configured to be mountable on the vertical surface of a structure (not shown) for convenience and accessibility. It will be understood that housing need not be mounted in this manner.

Housing 103 defines an interior 112 which is reached via a power inlet 113, a water inlet 114, a plurality of outlets 115, and an opening 117. A water conduit 119 supplies water from a water source (not shown), to water supply assembly 107 through water inlet 114. Water supply assembly 107 includes an inlet end 120 and an outlet end 122. A pressure regulator 123, coupled to conduit 119, regulates the pressure of the water supplied from the water source. To prevent contamination of the water source, a backflow preventer 124 is coupled to pressure regulator 123. Flow of water, supplied by the water source, from outlet end 122 is regulated by a water supply valve 125 coupled to backflow preventer 124.

Mixing assembly 110 is carried within housing 103 for receiving and mixing water with a pesticide to form a pesticide solution. With additional reference to FIG. 5, mixing assembly 110 includes a mixing chamber 130 defining a volume 132 and a distribution chamber 133 defining a volume 134. Volume 132 and a mixing chamber 130 is connected to volume of distribution chamber 133 by a port 135. Mixing chamber 130 further includes a water inlet 137 coupled to outlet end 122 of water supply assembly 107, and an access port 138 defined by a threaded neck 139 which extends out through opening 117 of housing 103. Access port 138 is sealably closed by a cover 140. Any closure means may be employed, but in this embodiment, cover 140 includes a threaded portion 142 receivable within threaded neck 139. A gasket 143 or O-ring is carried within neck 139, and compressed between threaded portion 142 of cover 140 and a shoulder 144 extending radially inward from threaded neck 139 proximate volume 132, to form a sealed closure of access port 138. Cover 140 further includes a vent valve 145 for venting mixing chamber 130. The purpose for vent valve 145 will be discussed in greater detail below.

Figures 5, 6:
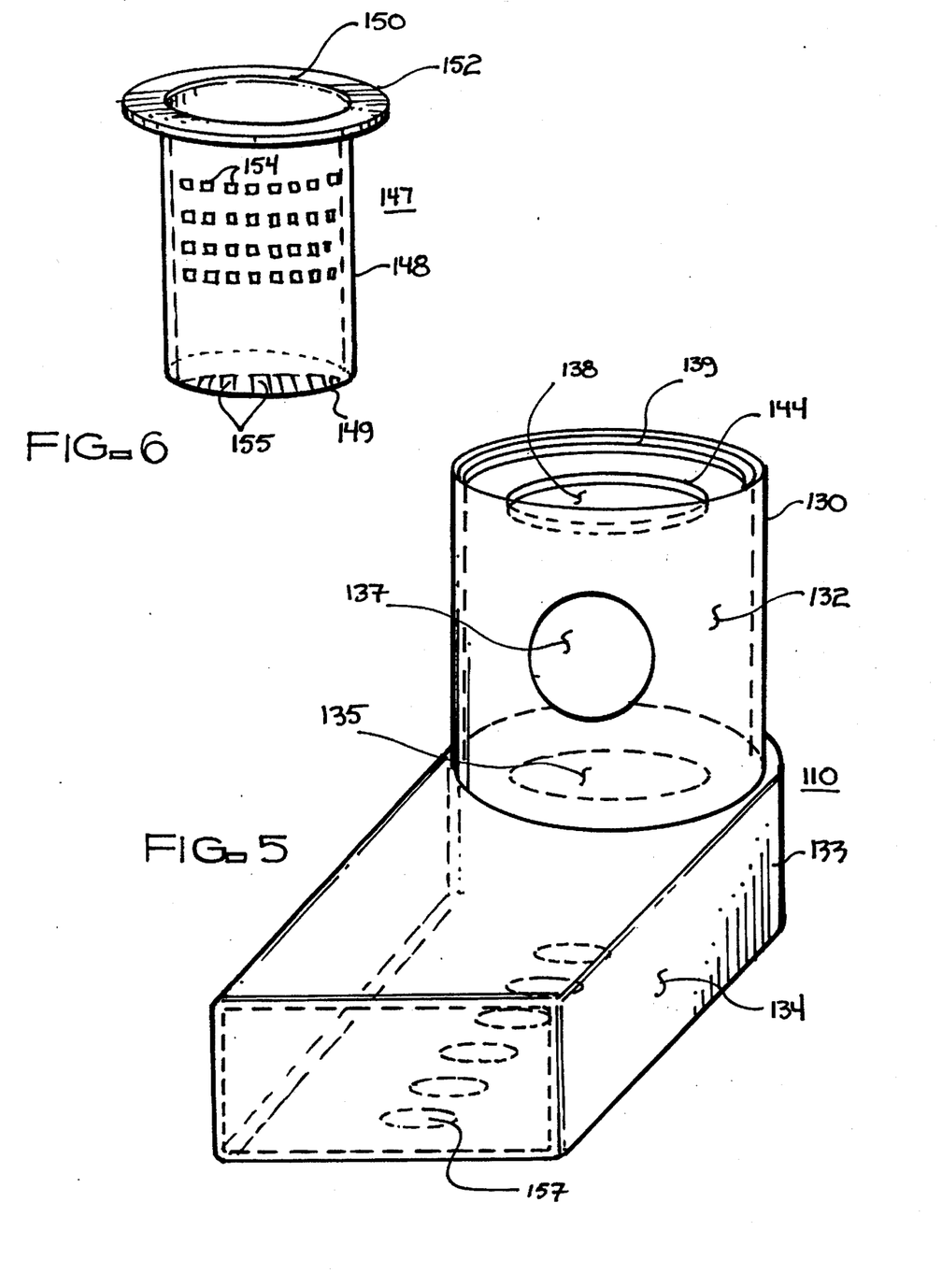
FIG. 5 is a perspective view of mixing assembly.
FIG. 6 is a perspective view of a basket.

Still referring to FIG. 4, with additional reference to FIG. 6, mixing chamber 130 carries a basket 147 having sides 148, bottom 149, and an open end 150. Open end 150 includes an outwardly directed flange 152. Basket 147 is sized to be received through access port 138 for insertion into mixing chamber 130. Flange 152 is received against an inset portion 153 of shoulder 144 and overlaid by gasket 143. Closure of access port 138 with cover 140, securely holds basket 147 in position by the compression of gasket 143 against flange 152. Basket 147 includes a plurality of apertures 154 and 155 formed in sides 148 and bottom 149, respectively, which permit water and the pesticide solution to pass through.

The object is to carry a pesticide within basket 147. The preferred pesticide is DURSBAN™ pesticide produced by DowElanco. DURSBAN™ pesticide is a water soluble pesticide which can be made in many different forms such as tablets, pellets, granules, gels, liquids, pastes, etc. It should be understood that the pesticide employed need not be limited to DURSBAN™ pesticide, but may include substantially any pesticide. Particularly, natural and environmentally friendly pesticides are preferred. Water passing from outlet end 122 of water supply assembly 107 enters mixing chamber 130 through inlet 137 as shown by direction arrow A. Water within mixing chamber 130 is under pressure determined by pressure regular 123, and is forced into basket 147 through apertures 154 formed in sides 148 as shown by direction arrows B. As water passes through basket 147 at a desired rate, entering through apertures 154 and exiting through apertures 155, it mixes with and/or dissolves the pesticide carried within to form a solution. The dissolution rate is controlled by the water flow rate through the pesticide. For DURSBAN™ pesticide, in order to provide the optimum level of active ingredient to the soil in the treatment area, the flow rate through mixing chamber 130 should be adjusted so that 0.32 ounces of active ingredient is dissolved per gallon of water flow. It is this solution which exits through apertures 155 formed in bottom 149 as shown by direction arrows C. The pesticide is introduced into basket 147 through access port 138. It will be understood by one skilled in the art that the pesticide may take many forms, including solids in powder, granule or tablet forms, gels etc. The form of the pesticide will be determinative of the form of the apertures of basket 147. Smaller apertures will be required for powders or gels than for tablets.

As the pesticide solution exits apertures 155, it passes through port 135 into distribution chamber 133. To prevent water entering mixing chamber 130 through water inlet 137 from exiting directly through port 135, basket 147 is positioned with bottom 149 substantially covering port 135. Water must first pass through basket 147 prior to entering distribution chamber 133.

Distribution chamber 133 has a plurality of outlets 157 corresponding to outlets 115 of housing 103. In this embodiment, six outlets 157 are employed, corresponding to six outlets 115, but one skilled in the art will understand that more than six, or as few as one may be employed as desired. Distribution devices 102 are coupled to outlets 115, and are selectively employed to deliver the pesticide solution to a desired area. Distribution devices 102 consist of a plurality of soaker tubes 158 coupled to outlets 115 by flow discs 159 which control the flow rate of pesticide solution to soaker tubes 158, and may include lengths of tubing 160 impervious to the insecticide solution for transporting the solution to distant areas before dispensing. A plurality of solenoid actuated valves 162 couple outlets 115 to corresponding outlets 157. Soaker tubes 158 are half inch diameter perforated rubber tubing, commercially available from Aqua Moisture Systems, but it should be understood that any diameter, porous or perforated tubing of rubber, PVC, plastic or the like, and other distributing devices such as spray heads etc. may be used.

Control assembly 104 controls the flow of fluids to mix the pesticide solution and deliver it to a desired location in a desired quantity. Control assembly 104 includes a timer/controller 163 powered by a power conduit 165 entering housing 103 through power inlet 113, plurality of valves 162 corresponding to outlets 115 and 157, and a cut-off switch 167. Timer/controller 163 may be a timing device, computer, or other control means. Timer/controller 163 may be further controlled by a computer control unit such as the Smart House Computer Control Unit available from Honeywell, which would provide complete hands off operation of the system along with other assigned tasks.

Timer/controller 163, upon demand by an internal timer, or an outside influence such as an operator or computer system, opens water supply valve 125, and any or all valves 162. This is generally accomplished by conversion of a 110 Watt input from power conduit 165 into a 12 Volt signal. The 12 Volt signal is employed to selectively actuate the solenoids of valves 162 and water supply valve 125. Water flowing from water supply assembly 107 enters mixing chamber 130 through water inlet 137, flows through the pesticide carried by basket 147, and enters distribution chamber 133 through port 135. The flow of pesticide solution continues out through one or more outlets 157 into corresponding distribution devices 102 depending upon which valve or valves 162 have been opened by timer/controller 163.

To prevent accidental spillage of pesticide, a cut-off switch 167 is coupled to housing 103 adjacent opening 117, and timer/controller 163. Cut-off switch 167 is closed when cover 140 is securely in place sealing access port 138. In this position, timer/controller 163 will operate normally. If cover 140 is removed, switch 167 will open, automatically closing or preventing the opening of water supply valve 125, and thus ensuring that no water will enter mixing chamber 130 while cover 140 is removed.

Figure 7:
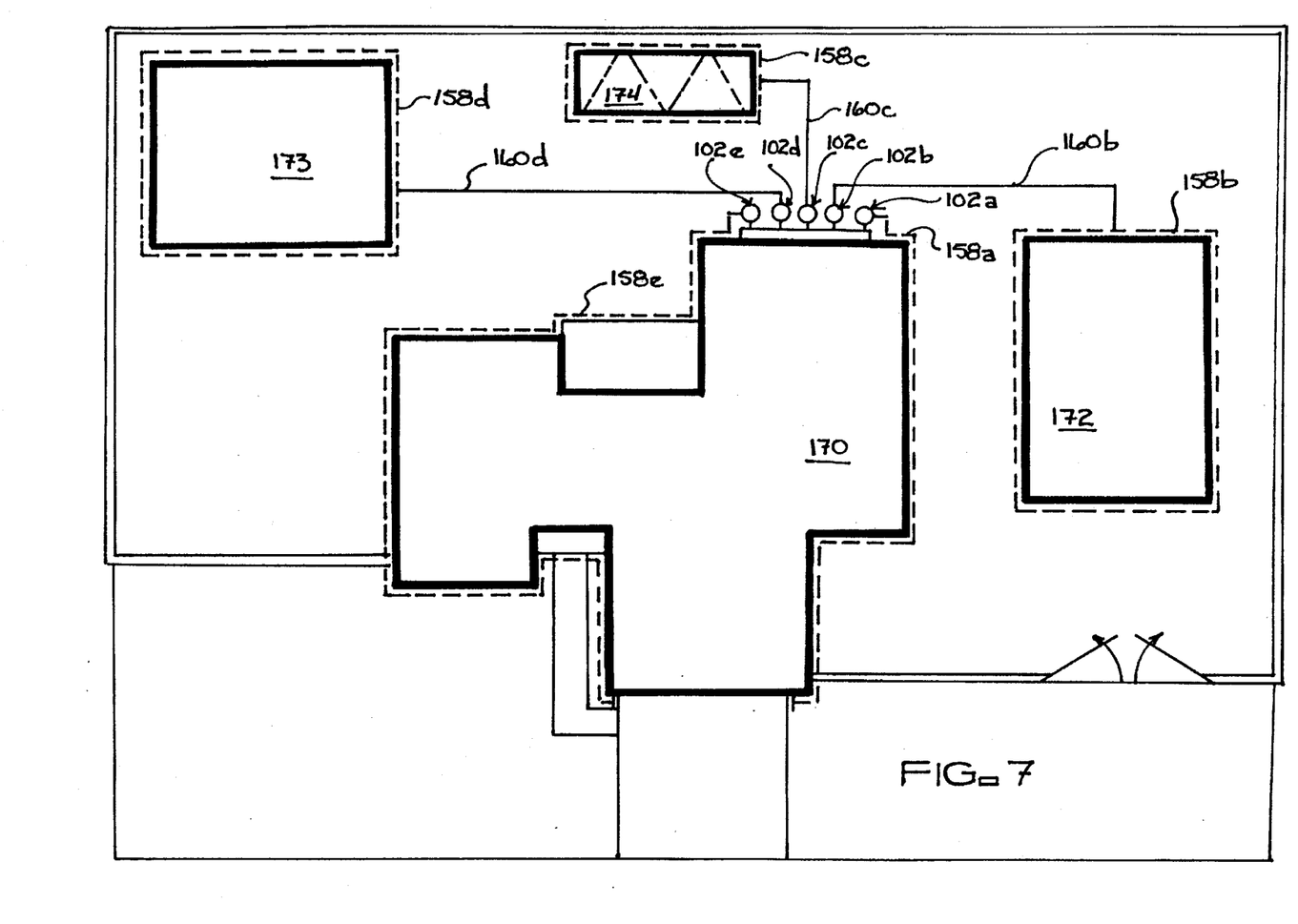
FIG. 7 is a top plan view of the insecticide applicator system of FIGS. 4–6, installed at a residence.

With additional reference to FIG. 7, each distribution device 102 may supply insecticide to a different area. Illustrated is an example of a dwelling including a house 170, a garage 172, a guest house 173, and a shed 174. Housing 103 is mounted to house 172 in a position conveniently located to the other locations. In order to differentiate between the different circuits of distribution devices 102, plurality of outlets 115 and outlets 157 will be further designated 115a–f and 157a–f, respectively. This is also the case for distribution devices 102 and elements thereof, and valves 162 which will be designated 102a–f and 162a–f, respectively.

In this example, a soaker tube 158a, illustrated by a broken line, extends from outlet 115a and forms a barrier along one side of house 170. Garage 172 is encircled by a soaker tube 158b which is coupled to outlet 115b by a tube 160b illustrated by a solid line. Shed 174 is encircled by a soaker tube 158c which is coupled to outlet 115c by a tube 160c illustrated by a solid line. As can be seen, soaker tubes 158 are not limited to the periphery of a building, they can also be buried under a foundation as illustrated here. Guest house 173 is encircled by a soaker tube 158d which is coupled to outlet 115d by a tube 160d illustrated by a solid line. A soaker tube 158e coupled to outlet 115e extends around the periphery of house 170 completing the barrier begun by soaker tube 158a.

At an appropriate time which has been predetermined, timer/controller 163 opens water supply valve 125 to begin pesticide distribution and the formation of a pesticide barrier. Water flows through mixing chamber 130 into distribution chamber 133, dissolving and mixing with the pesticide carried in basket 147. At the same time water supply valve 125 is opened, one or more of valves 162 are opened.

For example, valve 162a is opened permitting pesticide solution to flow into distribution device 102a for 9 minutes when soaker tube 158a is approximately 45 feet in length using a ½ g.p.m. flow disc 159a. Valve 162a is shut and valve 162b is opened permitting pesticide solution to flow into distribution device 102b for 14 minutes when soaker tube 158b is approximately 68 feet in length using a ½ g.p.m. flow disc 159b. Valve 162b is shut and valve 162c is opened permitting pesticide solution to flow into distribution device 102c for 6 minutes when soaker tube 158c is approximately 36 feet in length using a ½ g.p.m. flow disc 159c. Valve 162c is shut and valve 162d is opened permitting pesticide solution to flow into distribution device 102d for 12 minutes when soaker tube 158d is approximately 60 feet in length using a ½ g.p.m. flow disc 159d. Valve 162d is shut and valve 162e is opened permitting pesticide solution to flow into distribution device 102e for 16 minutes when soaker tube 158e is approximately 80 feet in length using a ½ g.p.m. flow disc 159e. Valve 162e and water supply valve 125 are closed.

After valve 162e and water supply valve 125 are closed, the entire residence has been properly barriered against insects. However, mixing assembly 110 will still be full of water. The presence of water in mixing chamber 130 will cause the pesticide within basket 147 to continue to dissolve. To prevent this, water must be drained from mixing chamber 130. This is accomplished by timer/controller 163 opening vent valve 145 and valve 162f. Valve 162f is coupled to a tube 160f which will carry the pesticide solution to a ground subgrade. The venting of mixing chamber 130 is necessary to permit mixing assembly to drain properly. Timer/controller 163 opens vent valve 145 and valve 162f for only a short period of time before closing them, as only about 18 ounces of liquid must be drained. In this manner, the pesticide within basket 147 will last longer and be in the proper condition for the next distribution cycle.

Various changes and modifications to the embodiment herein chosen for purposes of illustration will readily occur to those skilled in the art. For example, while the soaker tubing has been specifically illustrated and described as encircling the structure, it will be understood that the tubing may be placed inside the stem wall in new construction or laid in a serpentine pattern under an elevated structure. Similarly, the timer/controller can be positioned at any convenient or desired location internal or external to the building structure. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An automated pesticide applicator system comprising:
   a mixing assembly defining an interior and having an inlet and an outlet, the mixing assembly configured to hold an insecticide and receive water therein, the mixing assembly including:
      a mixing chamber defining a first volume for carrying the pesticide, the inlet formed in the mixing chamber and accessing the first volume;
      a distribution chamber defining a second volume distinct and separate from the first volume, the outlet formed in the distribution chamber in communication with the second volume; and
      a port formed in the mixing chamber and the distribution chamber, coupling the first volume and the second volume;
   a first valve coupled to the inlet of the mixing assembly and couplable to a water source; and
   a control assembly for controllably opening and closing the first valve and controllably opening and closing the outlet of the mixing assembly.

2. An automated pesticide applicator system as claimed in claim 1 wherein the mixing chamber further includes:
   a second port formed therein;
   a basket for carrying the pesticide receivable through the second port and positioned over and covering the port, the basket being water permeable to permit water flow therethrough; and
   a cover for closing the second port.

3. An automated pesticide applicator system as claimed in claim 1 wherein the control assembly includes:
   a second valve coupled to the outlet; and
   a timer/controller coupled to the first valve and second valve for controllably opening and closing the first valve and controllably opening and closing the second valve.

4. An automated pesticide applicator system as claimed in claim 3 wherein the controller assembly further includes a third valve coupled to mixing assembly in communication with the interior, and controllably opened and closed by the timer/controller.

5. An automated pesticide applicator system as claimed in claim 1 further including a distribution device coupled to the outlet of the mixing assembly.

6. An automated pesticide applicator system comprising:

a mixing assembly including a mixing chamber defining a first volume for carrying the pesticide, the mixing chamber having an inlet formed therein accessing the first volume, a distribution chamber defining a second volume distinct and separate from the first volume, the distribution chamber having a plurality of outlets formed therein, and a port formed in the mixing chamber and the distribution chamber coupling the first volume and the second volume;

a water supply assembly including a valve coupled to the inlet of the mixing assembly and couplable to a water supply;

a control assembly including a plurality of valves coupled to the plurality of outlets, and a timer/controller coupled to the plurality of valves and the valve for controllably opening and closing the valve and controllably and selectively opening and closing individual valves of the plurality of valves; and a plurality of distribution devices coupled to the plurality of valves.

7. An automated pesticide applicator system as claimed in claim 6 wherein the mixing chamber further includes:

a second port formed therein;

a basket for carrying the pesticide receivable through the second port and positioned over and covering the port, the basket being water permeable to permit water flow therethrough; and a cover for closing the second port.

8. An automated pesticide applicator system as claimed in claim wherein the controller assembly further includes a third valve coupled to the cover and in communication with first volume and controllably opened and closed by the timer/controller.

9. A method of distributing an insecticide, comprising the steps of:

providing a mixing assembly including a mixing chamber defining a first volume for carrying a pesticide, the mixing chamber having an inlet formed therein accessing the first volume, a distribution chamber defining a second volume distinct and separate from the first volume, the distribution chamber having a plurality of outlets formed therein, and a port formed in the mixing chamber and the distribution chamber coupling the first volume and the second volume, a water supply assembly including a valve coupled to the inlet of the mixing assembly and couplable to a water supply, a control assembly including a plurality of valves coupled to the plurality of outlets, and a timer/controller coupled to the plurality of valves and the valve for controllably opening and closing the valve and controllably and selectively opening and closing individual valves of the plurality of valves, and a plurality of distribution devices coupled to the plurality of valves;

supplying a pesticide in the mixing chamber;

attaching the first valve to a water source;

opening the first valve to supply water to the mixing chamber;

forming a pesticide solution by dissolving the pesticide in the water;

allowing the pesticide solution to flow into the distribution chamber; and opening selected ones of said plurality of valves.

10. A method as claimed in claim 9 wherein the step of forming a pesticide includes:

providing a second port formed in the mixing chamber, a basket for carrying the pesticide, receivable through the second port and positioned over and covering the port, the basket being water permeable to permit water flow therethrough, and a cover for closing the second port; and permitting water flow through the basket at a flow rate to dissolve the pesticide in at a given concentration.

11. A method as claimed in claim 9 further including the steps of:

closing the first valve and the selected ones of the plurality of valves; and draining the pesticide solution and the water from the mixing assembly.

12. A method as claimed in claim 11 wherein the step of draining includes:

providing a third valve coupled to cover in communication with the first volume; and opening the third valve and a selected one of the plurality of valves.

* * * * *

UNITED STATES PATENT AND TRADEMARK OFFICE
CERTIFICATE OF CORRECTION

PATENT NO. : 5,660,330
DATED : 26 August 1997
INVENTOR(S) : JAMES F. SCOTT

It is certified that error appears in the above-indentified patent and that said Letters Patent is hereby corrected as shown below:

Column 4, Line 44, replace the second "20a'" with --20a"--

Column 5, Line 24, replace "Volume 132 and a mixing chamber" with --Volume 132 of mixing chamber--.

Column 5, Line 25, add --134-- after "connected to volume".

Column 5, Line 65, replace "regular" with --regulator--.

Column 9, Line 40, add --7-- between "claim" and "wherein".

Signed and Sealed this

Sixteenth Day of December, 1997

Attest:

BRUCE LEHMAN

Attesting Officer     Commissioner of Patents and Trademarks